United States Patent [19]
Fishman

[11] Patent Number: 6,044,084
[45] Date of Patent: Mar. 28, 2000

[54] COLLISION DETECTION FOR PACKET-SWITCHED MULTIPLE-PATH COMMUNICATION SYSTEM

[75] Inventor: Barry Fishman, San Pedro, Calif.

[73] Assignee: Hughes Electronics Corporation, El Segundo, Calif.

[21] Appl. No.: 08/944,875

[22] Filed: Oct. 6, 1997

[51] Int. Cl.[7] .................................................. H04B 7/24
[52] U.S. Cl. ........................ 370/445; 370/316; 370/522
[58] Field of Search ................................ 370/445, 446, 370/447, 310, 315, 316, 461, 349, 475, 229–253, 522, 410

[56] References Cited

U.S. PATENT DOCUMENTS

| | | | |
|---|---|---|---|
| 4,736,371 | 4/1988 | Shunichiro | 370/95 |
| 4,775,974 | 10/1988 | Kobayashi | 370/104 |
| 4,885,743 | 12/1989 | Helbers et al. | 370/85.2 |
| 5,477,531 | 12/1995 | McKee et al. | 370/17 |
| 5,734,687 | 3/1998 | Kainulainen | 375/357 |
| 5,870,388 | 2/1999 | Yung et al. | 370/260 |

FOREIGN PATENT DOCUMENTS 01227544  11/1989  Japan .

OTHER PUBLICATIONS

Stefan Ramseier, et al "A Protocol For Satellite Access Via Use Of Spor–Beams" Jan. 1993, pp. 443–448.

*Primary Examiner*—Huy D. Vu
*Assistant Examiner*—Dung Trinh
*Attorney, Agent, or Firm*—Georgann S. Grunebach; M. W. Sales

[57] ABSTRACT

A method and system for detecting collision of transmitted signals in a random-access, multiple-path communication system utilizes a packet coding arrangement where a transmitting transceiver terminal assembles a plurality of packets into a coded transmit block. Each transmit block is coded with an error detection code, or assigned time slots, so that a routing controller will discard an entire transmit block if any of the packets are not properly decoded. Each transmit block further includes a self-addressed packet, wherein receipt of the self-addressed packet by the transmitting terminal indicates that no collision has occurred. Thus, the present invention does not require any additional circuitry or control of the routing controller, nor transmission of an acknowledgement signal in order to detect collision of transmitted signals.

16 Claims, 2 Drawing Sheets

COLLISION DETECTION FOR PACKET-SWITCHED MULTIPLE-PATH COMMUNICATION SYSTEM

TECHNICAL FIELD

The present invention relates to multiple access, packet-switched multiple-path communication systems, and more particularly, to detecting collisions of transmitted signals in such a communication system.

BACKGROUND ART

Generally, communication systems in which numerous transceiver terminals share the total available transmission capacity must employ some form of contention-access protocol to achieve an efficient use of that capacity. Examples of commonly employed contention protocols used in communication systems involving bursty traffic, i.e. short sporadic transmissions, include ALOHA, slotted ALOHA, and CSMA (carrier sense multiple access).

More specifically, ALOHA was originally developed for packet radio networks. In an ALOHA arrangement, whenever a terminal wishes to send a signal (i.e., a packet or frame), that terminal simply begins transmitting the signal. The terminal then listens for either its own transmission, or a return acknowledgement sent by the destination terminal, and if the transmission or acknowledgement is not received within a certain period of time, the transmitting terminal will retransmit the signal.

Slotted ALOHA was developed as a modification to "pure" ALOHA to improve system utilization and efficiency. In a slotted ALOHA arrangement, time on a channel is divided into uniform slots, with transmission only being permitted to begin at the start of a slot. A central clock is typically used to synchronize all competing stations. As with pure ALOHA, slotted ALOHA arrangements either listen for their own transmission as a form of acknowledgement, or utilize a return acknowledgement signal sent by a destination source as an indication of non-collision of the transmitted signal.

CSMA was developed to improve utilization efficiency of a communication system over that which is achieved with ALOHA. In a CSMA arrangement, a terminal that wishes to transmit must first listen to the transmission medium to determine if there are any ongoing transmissions. A terminal can only transmit if the medium is idle, and if the medium is detected as being busy, the terminal must wait until the medium becomes idle. If an acknowledgement is not received from the destination terminal, the transmitting terminal will assume a collision has occurred and begin retransmitting the signal.

While such contention protocols improve utilization efficiency, problems arise in multiple-path or multiple-beam communication systems because a source and destination terminal can reside on different paths or beams. Thus, a transmitting terminal may not be able to receive any of its own transmissions. As a result, conventional contention protocols such as ALOHA or CSMA will not provide a satisfactory level of access sharing and system utilization. In addition, the use of an acknowledgement signal sent by a destination terminal upon proper receipt of a transmitted signal can double the delay time for detecting a collision, and reduce terminal throughput.

DISCLOSURE OF THE INVENTION

It is therefore an object of the present invention to provide a method and system for detecting a collision of transmitted signals in a packet-switched multiple-path communication system which overcomes the deficiencies of known contention protocols.

It is another object of the present invention to provide a method and system for detecting a collision of transmitted signals in a packet-switched multiple-path satellite communication system which does not require any special adaptations of a packet routing controller.

It is yet another object of the present invention to provide a method and system for detecting a collision of transmitted signals in a packet-switched multiple-path satellite communication system which reduces the amount of time needed to determine whether a collision has occurred.

It is still another object of the present invention to provide a method and system for detecting a collision of transmitted signals in a packet-switched multiple-path satellite communication system which does not require a receiving terminal to send an acknowledgement signal.

In accordance with these and other objects, the present invention provides a random-access multiple-path communication system having a plurality of transceiver terminals that communicate with each other. A packet routing controller is provided for routing transmitted signals to a destination transceiver terminal. A method is provided for detecting collision of signals transmitted from different terminals which includes, in each transmitting terminal, assembling a plurality of information packets into a transmit block. Each information packet includes an address header identifying the destination terminal for the packet and a data segment. One of the plurality of information packets is self-addressed in each transmit block to the transmitting terminal. Each transmit block is coded so that failure of the routing controller to properly receive each of the plurality of packets causes the routing controller to discard the entire transmit block. Each transmit block is transmitted to the packet routing controller. The occurrence of a collision-free transmission of the transmit block is determined if the self-addressed information packet is received by the transmitting terminal.

In accordance with another aspect of the present invention, a random-access, multiple-path communication system includes a plurality of transceiver terminals. Each terminal includes a processor and an encoder operative to form a plurality of information packets into a transmit block wherein each information packet comprises an address header identifying a destination terminal for the packet and a data segment. A packet routing controller communicates with each of the plurality of transceiver terminals using a predetermined one of the multiple paths. The encoder in each of the plurality of transceivers is further operative to include a self-addressed packet in every transmit block, and to code each transmit block so that failure of the packet routing controller to decode any of the plurality of information packets causes the routing controller to discard the entire transmit block. Each processor is operative to determine a collision-free transmission of a transmit block upon receipt of a corresponding self-addressed packet.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
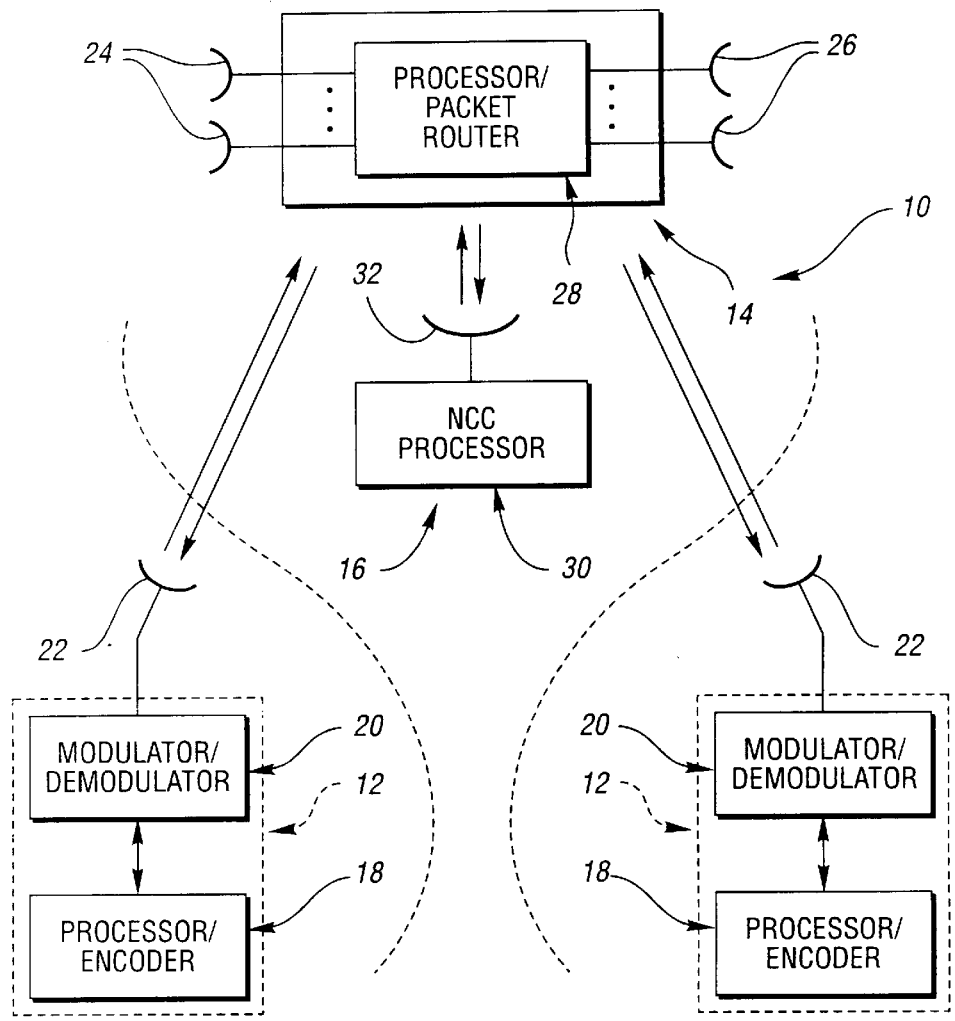
FIG. 1 is a block diagram of an exemplary embodiment of a random access multiple path satellite communication system employing the present invention.

FIG. 1 shows an exemplary embodiment of a high data rate multiple-path satellite communication system 10 into which the present invention may be incorporated. System 10 generally includes a plurality of end-user terminals 12, such as very small aperture terminals (VSATs), that communicate with each other by way of a satellite relay system 14 acting as a packet router. A network control center (NCC) 16 can be provided to control and coordinate communication between the user terminals 12 and the satellite 14. In order to allow multiple access, frequency-division-multiplexing (FDM), time-division-multiplexing (TDM), or code-division-multiplexing (CDM) can employed on uplinks from terminals 12 and the NCC 16, and on downlinks from satellite 14, as is generally well understood in the art.

Each end-user terminal 12 includes encoder/signal processor 18, a transceiver 20 for modulating and demodulating input and output data, and an antenna 22 for transmitting and receiving encoded data to and from satellite relay system 14. Satellite relay system 14 includes a plurality of receive antennas 24, a plurality of transmit antennas 26, and a signal processor/packet router 28. NCC 16 includes a control processor 30 for generating configuration and control signals that link the user terminals 12 by way of the satellite relay system 14, and an antenna 32 coupled to the control processor 30 for transmitting and receiving the configuration and control signals.

The plurality of receive antennas 24 operate in a first frequency band and produce a first plurality of beams that cover a predefined geographical service area. The plurality of receive antennas 24 receive data from a transmitting user terminal 12 on a first beam. The plurality of transmit antennas 26 operate in a second frequency band and produce a second plurality of beams that cover the predefined service area. The plurality of transmit antennas 26 transmit data to a receiving second user terminal 12 on a second beam.

Signal processor/packet router 28 is arranged to demodulate data received on the first beam from the first user terminal, route the demodulated data so that it is transmitted on the second beam to the second user terminal, remodulate the demodulated data to provide encoded data, and transmit the data on the second beam to the second user terminal.

Figure 2:
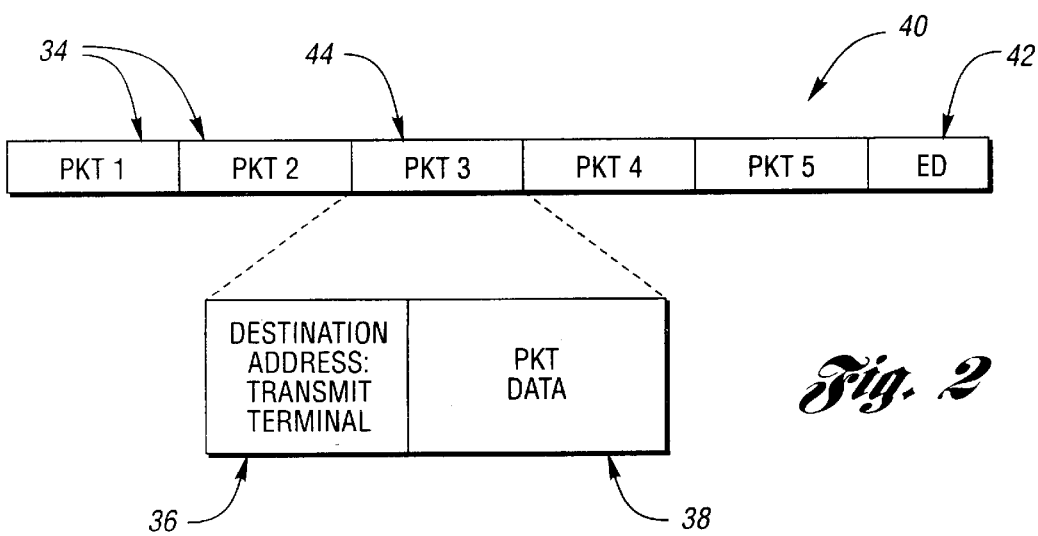
FIG. 2 is a diagram showing a packet coding arrangement in accordance with the present invention.

As shown in FIG. 2, transmission of data from one terminal to another is performed using a packet-switching type protocol, where data transmissions are divided into smaller packet segments 34 prior to transmission on the FMD uplink. Each packet 34 includes a destination address 36 and a data packet portion 38. A plurality or grouping of packets are then assembled and transmitted in a coded block 40.

In accordance with the present invention, an error detection coding arrangement is utilized to generate an error detection code 42 for each coded block 40, and can be implemented as an error correction code. With such an arrangement, the present invention is able to ensure that if one of the packets 34 in a coded block is received at the routing point, such as the satellite relay system 14, then the entire block was received free of errors. This, in turn, provides an indication that the transmitted block did not suffer any collisions with other transmitted blocks. In other words, since all packets in a coded block are protected by the same error detection code 42, any collision with another transmission would cause link errors, thereby forcing a decoder in satellite 14 to discard the entire block.

Alternatively, the same effect can be achieved in accordance with the present invention using an adapted slotted ALOHA type coding arrangement for transmission of each transmit block 40. More specifically, if the transmit block 40 is coded so that all assigned time slots are correspondingly filled by packet segments 34, then failure to decode any of the packets/slots assigned to the transmit block would cause the router to discard the entire transmit block as is well understood to one having ordinary skill in the art. Thus, with such a coding arrangement, addition of the error code would no longer be necessary. Accordingly, the individual packets 34 shown in FIG. 2 would be representative of individual time slots in an assigned block of time slots.

In accordance with the present invention, a transmitting terminal automatically addresses one of the packets 34 in each coded block 40 back to itself, i.e., a "self-addressed" packet 44. Thus, when the block of packets is received at the routing point, the satellite will simply route the self-addressed packet back to the transmitting terminal when performing its normal routing function. Because any non-correctable decoding error causes the entire coded block to be discarded, receipt of the self-addressed packet 44 indicates to the transmitting terminal that no collision has occurred.

Figure 3:
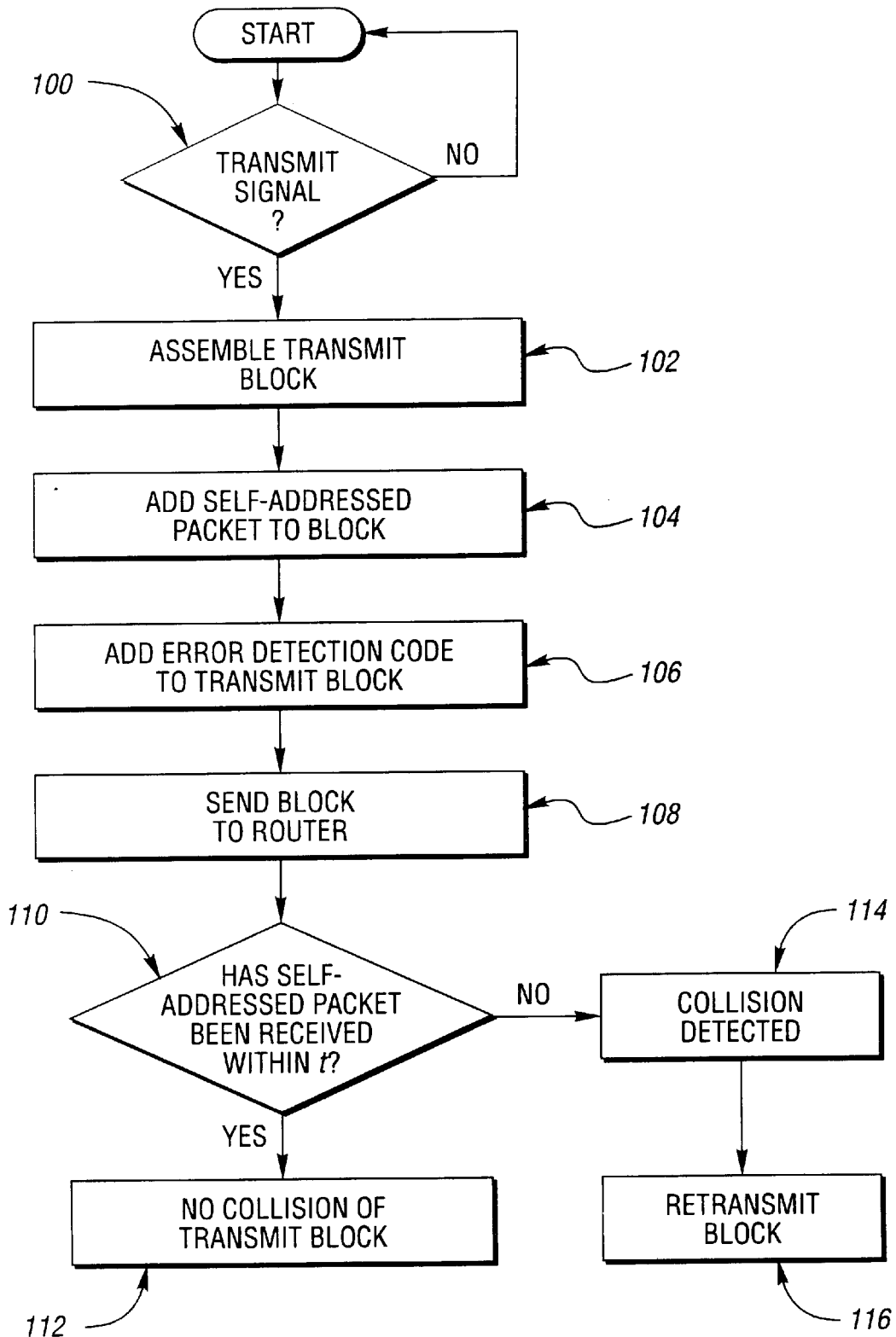
FIG. 3 is a flow chart illustrating the overall operation of the present invention.

FIG. 3 provides a flow chart illustrating the overall operation of the present invention. As shown at block 100, each terminal determines whether a signal is to be transmitted. If so, at block 102 data packets are assembled into respective transmit blocks, and at block 104, a self-addressed packet is included in each transmit block. At block 106, the transmit block is appropriately coded either by appending an error detection code, or using assigned time slots as described above.

The transmit block is then sent to the router at block 108, after which at block 110 the transmitting terminal determines whether the self-addressed packet is received within a predetermined period of time t. If the self-addressed packet is received, the terminal determines that a collision did not occur as shown at block 112. If the self-addressed packet is not received, the terminal determines at block 114 that a collision has occurred and retransmits the transmit block at block 116.

Thus, the present invention overcomes the problems of conventional contention-access protocols by providing collision detection capability without requiring any additional circuitry or programming in the satellite relay system 14, and without requiring the destination terminal to transmit an acknowledgement. This, in turn, decreases the amount of time necessary for a transmitting terminal to determine that a transmission was not received and must be resent. In addition, even when a transmitting terminal is in the same beam as a destination terminal, in accordance with the invention, the self-addressed packet is the only packet that the transmitting terminal needs to receive. Thus, the transmitting terminal does not need to receive the entire transmission, and possibly the entire transmission of all other terminals sharing the link, in order to determine whether the corresponding transmission was successful.

While the best mode for carrying out the invention has been described in detail, those familiar with the art to which this invention relates will recognize various alternative designs and embodiments for practicing the invention as defined by the following claims.

What is claimed is:

1. In a random-access, multiple-path communication system having a plurality of transceiver terminals communicating with each other, and a packet routing controller for routing transmitted signals to a destination transceiver terminal, a method for detecting collision of signals transmitted from different terminals comprising the steps of:

in each transmitting terminal, assembling a plurality of information packets into a transmit block, wherein each information packet comprises an address header identifying the destination terminal for the packet, and a data segment;

self-addressing one of the plurality of information packets in each transmit block to the transmitting terminal;

coding each transmit block so that failure of the routing controller to properly receive each of the plurality of packets causes the routing controller to discard the entire transmit block;

transmitting each transmit block to the packet routing controller; and determining the occurrence of a collision-free transmission of the transmit block if the self-addressed information packet is received by the transmitting terminal.

2. The method of claim 1 wherein said coding step comprises generating an error detection code for each transmit block.

3. The method of claim 1 wherein said coding step comprises generating an error correction code for each transmit block.

4. The method of claim 1 wherein said coding step comprises coding each packet of a transmit block into one of a plurality of assigned transmission time slots.

5. The method of claim 1 further comprising the step of retransmitting the transmit block if the self-addressed packet is not received within a predetermined period of time.

6. In a random-access, multiple-beam satellite communication system having a plurality of transceiver terminals communicating with each other, and a packet routing controller located in a satellite relay for routing transmitted signals to a destination transceiver terminal, a method for detecting collision of signals transmitted from different terminals comprising the steps of:

in each transmitting terminal, assembling a plurality of information packets into a transmit block, wherein each information packet comprises an address header identifying the destination terminal for the packet, and a data segment;

self-addressing one of the plurality of information packets in each transmit block to the transmitting terminal;

coding each transmit block so that failure of the satellite routing controller to properly receive each of the plurality of packets causes the satellite routing controller to discard the entire transmit block;

transmitting each transmit block to the packet satellite routing controller; and determining the occurrence of a collision-free transmission of the transmit block if the self-addressed information packet is received by the transmitting terminal.

7. The method of claim 6 wherein said coding step comprises generating an error detection code for each transmit block.

8. The method of claim 6 wherein said coding step comprises generating an error correction code for each transmit block.

9. The method of claim 6 wherein said coding step comprises coding each packet of a transmit block into one of a plurality of assigned transmission time slots.

10. The method of claim 6 further comprising the step of retransmitting the transmit block if the self-addressed packet is not received within a predetermined period of time.

11. A random-access, multiple-path communication system comprising:

a plurality of transceiver terminals each comprising a processor and an encoder operative to form a plurality of information packets into a transmit block, wherein each information packet comprises an address header identifying a destination terminal for the packet, and a data segment; and a packet routing controller in communication with each of said plurality of transceiver terminals using a predetermined one of the multiple paths, wherein the processor in each of said plurality of transceivers is further operative to include a self-addressed packet in every transmit block, and to encode each transmit block so that failure of said packet routing controller to decode any of the plurality of information packets in the transmit block causes said routing controller to discard the entire transmit block, wherein each transceiver processor is further operative to determine a collision-free transmission of a transmit block upon receipt of a corresponding self-addressed packet.

12. The system of claim 11 wherein each transmit block is encoded comprising an error detection code.

13. The system of claim 11 wherein each transmit block is encoded comprising an error correction code.

14. The system of claim 11 wherein each transmit block is encoded having each packet located in one of a plurality of assigned time slots.

15. The system of claim 11 wherein each transceiver processor is further operative to determine if the self-addressed packet is received within a predetermined period of time, and to retransmit the transmit block is not received within the predetermined period of time.

16. The system of claim 11 wherein said packet routing controller comprises a satellite relay.

* * * * *